Sept. 2, 1969 A. R. KLEINKAUF 3,464,342
APPARATUS FOR CONTINUOUS PRESSURE COOKING OF FIBROUS MATERIALS
Filed Aug. 16, 1966
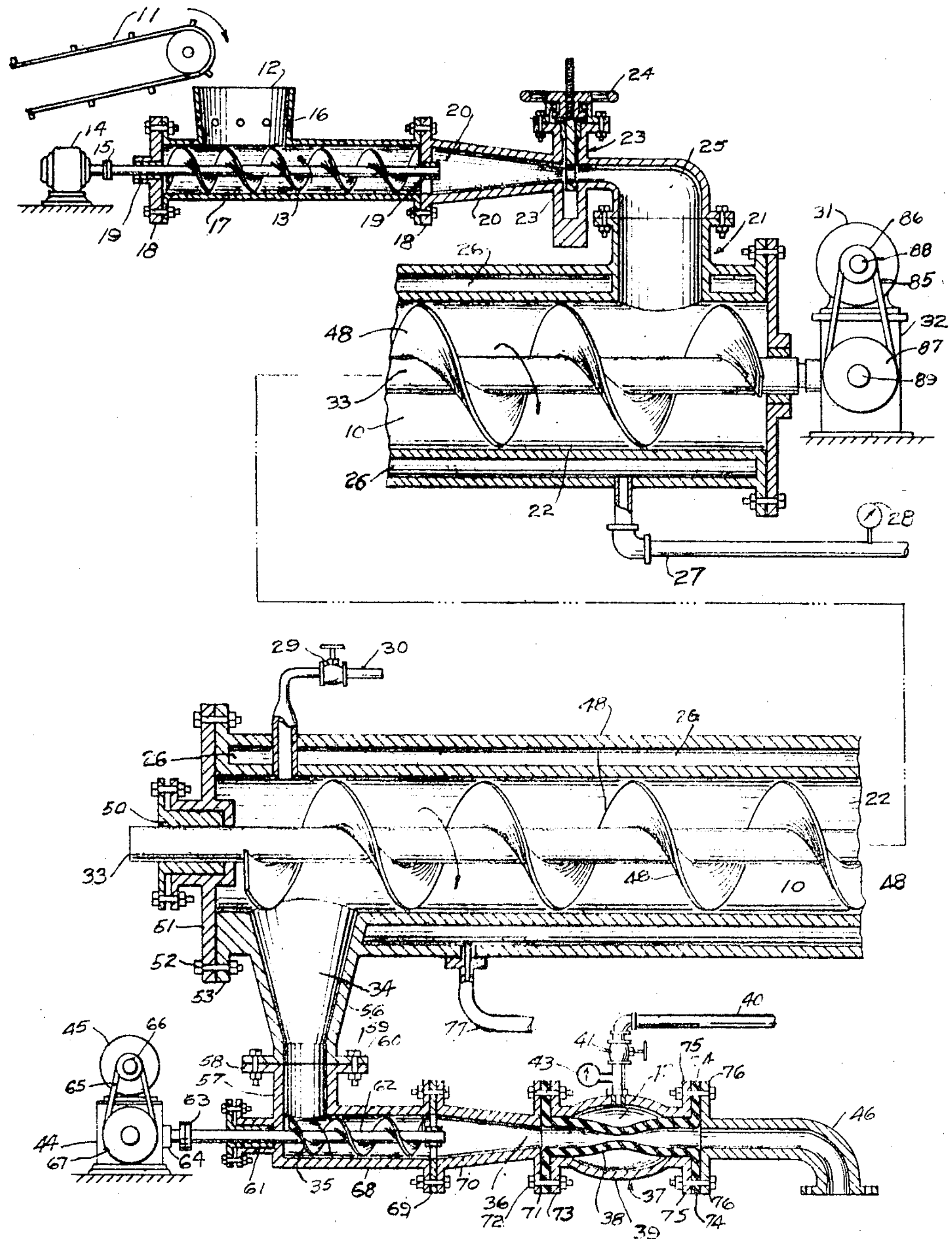
Allen R. Kleinkauf
INVENTOR.
BY James Harrison Bowen
ATTORNEY 3,464,342
Patented Sept. 2, 1969

3,464,342

APPARATUS FOR CONTINUOUS PRESSURE COOKING OF FIBROUS MATERIALS

Allen R. Kleinkauf, St. Petersburg, Fla.
(Rte. 1, Box 169, Williston, Fla. 32696)

Filed Aug. 16, 1966, Ser. No. 572,828
Int. Cl. A23k *1/00;* A23l *3/22*
U.S. Cl. 99—235 5 Claims

ABSTRACT OF THE DISCLOSURE

The instant disclosure consists in a device for treating chicken feathers and the like resulting in a product utilizable as a feed component for poultry and cattle. The material is supplied to a charging chamber wherefrom a screw conveyor forces it to a pressure cooker. A tapered restriction or reduction chamber between the charging chamber and the cooker affords a squeezing of the feathers to an extent such that a seal is formed against the inner walls of the restriction chamber. The exit from this chamber is controlled by a knife blade cut off valve for cutting through the material and blocking further exit from the restriction chamber, when desired. The cooker consists of a steam-jacketed pipe, interiorly receiving the material from the charging chamber and feeding it interiorly of the pipe, by means of a screw conveyor to a discharge controlled by a sphincter valve. This valve has flexible walls and its flexure is caused by compressed air. A third screw conveyor receives the material from the discharge from the cooker and feeds it to the sphincter valve.

The present invention relates to the art of hydrolizing chicken feathers and the like in the commercial production of feather meal in which the chicken feathers are subjected to steam under pressure in a continuous process of loading and unloading into a pressure vessel in order to accomplish the de-naturation required to reduce this raw material into a product suitable for utilization as a feed component for poultry and cattle.

The purpose of this invention is to provide an apparatus for processing chicken and other poultry feathers in which the process may operate continuously.

Prior to the present invention, this process of hydrolization was carried out by charging a pressure steam vessel with a batch of raw wet feathers, sealing the vessel, and cooking the material under pressure as the charge was being mechanically stirred or agitated by an assembly of paddles rotated from the outside of the pressure vessel. After hydrolization or denaturation progresses to a predetermined degree, the charge is deposited into a dryer, or dried to a meal in the batch cooker itself by means of evaporation of the contained moisture.

It is the object of this invention to provide a means whereby the cooking process or hydrolization can be carried out continuously, thereby eliminating the requirement for batching equipment and the related storage, and also load accumulation equipment. In addition, a more uniform and more closely controlled product of potentially improved quality can be obtained, since there are no large masses of semi-cooked feathers that may have matted together around one of the stirring paddles as in the batch process to detract from a uniform, high-quality product by use of this continuous method.

It is another object of this invention to provide an apparatus for the continuous processing of the feathers of chickens, turkey and other fowl, as well as other fibrous materials. In this process the said materials are continuously cooked and the processing is carried out at a rate equivalent to the rate at which these raw materials are supplied from the feather picking machines in the adjacent poultry cleaning plant.

By the continuous processing of these by-products from the poultry processing plant and at the same rate the chickens or other fowl are being dressed, the need for extensive accumulating and storage equipment of these raw waste products is avoided.

Since the batching process requires considerable cooking time, ranging upward to six hours per batch, large volumes of feathers in their uncooked state must be temporarily stored at the present commercial chicken processing plants. These wet poultry feathers produce offensive odors and tend to immediately start a decomposition process, with associated objectionable odors as they continue to decompose. By elimination of the requirement for batching these problems are avoided, and in addition, a higher quality of the finished feed product is produced; particularly when fresh raw materials are charged into the cooking vessels.

The present invention will allow the by-product processing to be carried out immediately in conjunction with the chicken processing, and in the immediate vicinity or location of the poultry dressing plant thereby eliminating the present requirement existant at many poultry cleaning and processing plants, that the waste or by-products be transported considerable distances over public roads to sites where rendering plants can be located.

It is another object of this invention to provide means by which fibrous materials, such as chicken feathers, animal hair, wood fibres and other similar products can be introduced into a chamber operating at either an elevated, or at a reduced pressure, different from that of atmospheric, and then subsequently returned to a normal atmospheric environment on a continuous and uninterrupted basis.

This object is accomplished by arranging the flow of raw materials in such fashion that they provide their own seal, and in and out of themselves create sufficient restraining forces against the side walls of their entry and exit orifices to prevent the escape of the entrapped pressures. The associated mechanism provides a means by which the raw materials are used as their own sealing medium and are continuously replaced with newly added raw materials as they are passed on through the process.

The manner of accomplishing the foregoing objectives, as well as further objects and advantages, will be made manifest in the following description taken in conjunction with the accompanying drawing, wherein:

The figure shown in the drawing is a longitudinal section through the upper portion of a pressure cooker for chicken and other poultry feathers, and similar fibrous materials, the forward part of the cooker being broken away.

Referring now to the drawing wherein like reference characters denote corresponding parts, the apparatus for continuous pressure cooking of fibrous materials of this invention includes a cooker 10, a conveyor 11 for feeding wet feathers and the like to a hopper 12, a screw conveyor or auger 13 mounted below the throat or hopper 12 and positioned to receive the wet feathers or fibrous material, from the hopper, a motor 14 for driving the auger 13, a reduction gear 15 for controlling the speed of the screw conveyor 13, numeral 16 indicating outlet or drain openings drilled around the hopper 12, to allow excess water squeezed out of the wet feathers that are being forced horizontally along the charging chamber 17 and past the bearing support 18 and bearing 19 into the reduction chamber 20. In operation, the reduction chamber 20 squeezes the feathers or other fibrous material together so tightly that a seal is formed against the side walls of the chamber 20 so that steam is not allowed to escape from the cooking chamber 22 of the pressure chamber 21. This effectively provides a pressure seal and is used as one of the claims of this invention, in that this seal is made up of the same material as that being cooked and by its very operation, in effect, uses the same material, thereby providing its own pressure seal, and utilizing its fibrous matting properties. As the material is passed through the pressure sealing throat of the reduction chamber 20 a new charge of fresh raw material replaces that which is passing into the cooking stage of the process. By this continuous replacement of the sealing material with new materials the pressure required to effect the cooking and hydrolization is maintained and made constant.

In order to make it possible to start and stop the process, especially once it has been in operation, and has been brought up to operating pressures, a guillotine type of knife blade-cut-off valve 23 is placed in the flow stream such that this valve, 23, which is commercially available, and known as a paper pulp valve, is closed, by rotating the valve wheel 24, and the blocking plate portion of the slide gate is slid across the matted fibres, cutting them off, and effectively placing a barrier across the opening into the charging chamber 25. This is accompanied by turning off the driving motor 14 so that new materials are not forced into the reduction chamber 20.

At the time the process is to be resumed, the electric motor 14 is restarted and the sliding valve 23 is lifted by rotation of valve wheel 24 to allow the feathers to once again pass through the opening in the valve blade and on into the cooking chamber 22.

As additional material is added, the feathers are pushed on into the charging inlet 25 and drop into the cooking chamber 22. This cooking chamber 22 is made in the form of a steam-jacketed pipe completely surrounded by an annulus 26 that is charged with high-pressure steam as a source of cooking heat and which is fed through pipe 27 from a boiler or other source, and maintained at a pressure and temperature as indicated on gauge 28 and as required to establish and maintain the appropriate cooking pressure inside the cooker 21. The pressure inside this cooking chamber 22 is maintained by establishing the appropriate setting on pressure relief valve 29, so that excess pressures in the form of steam are permitted to escape through escape vent 30. This venting pipe 30 in turn is connected to appropriate condensing apparatus of commercial design, although it is not shown as a part of this drawing. This condensing equipment must be of the barometric or aerial condensing type, with accessory equipment as required to burn the non-condensable hydrocarbons in the residual gases and effectively destroy all odors.

The feathers are conveyed by motor 31 and screw 33 at an appropriate rate of speed as required and as adjusted by variable speed controller 32, and moved along inside the cooking chamber. The cooking chamber can be built to any required length, or can be made up of a series of similar steam jacketed pipes containing powered screw conveyors.

As the feathers are conveyed along the inside of the pressure cooking chamber 22, the moisture is cooked out of the product and released by the cooking process and is readily converted to steam at these elevated pressures and temperatures. The steam passes through the pressure relief valve 29 and on through pipe 30 to the condensors.

The cooked feathers are dropped down into the discharge loading chamber 34 and then squeezed by the discharge auger 35 and passed through a reduced throat 36 into a sphincter valve 37, consisting of a flexible tube 38 that is mounted inside a cast steel housing 39, in such fashion that compressed air can be introduced through pipe 40 and valve 41 into the annular space 42 around the flexible tube 38, thereby serving to extend a positive pressure as required and indicated on gauge 43, pressing against the outer sides of the flexible tube 38, thereby causing it to collapse against the cooked feathers, restraining their passage and effectively sealing the pressure in cooker 22. By the correct balance of a pressure differential on the outer surfaces of the flexible tube 38 and the forces applied by discharge auger 35, through variable speed motor drive 44 and motor 45, the cooked material can be allowed to pass through the sphincter valve 37 and on into the discharge opening 46.

This discharge is integrally connected to some drying mechanism of commercial design, or to a series of similar steam jacketed screw conveyors, identical to cooker 21, along with the required drives and odor controlling equipment, but operating at atmospheric pressures.

The pressurized steam jacket 26 is charged with high pressure steam from a boiler through pipe 27, having a gauge 28 and connected to a boiler steam condensate return line 77. The pressure cooker 10, in which the shaft 33 and screw conveyor 48 are positioned, is provided with a packing gland and bearing 50 in a sealing plate 51 which is secured by bolts 52 to a flange 53 on the end of pressure chamber 22.

The pressure cooker is provided with a vent 30 having a relief valve 29 therein; and the pressure cooker connects with a reducing fitting 56 on the lower end of which a nipple 57 is positioned. The upper end of the nipple 57 is provided with a flange 58 that is secured by bolts 59 to a flange 60 on the lower end of the reducing fitting 56. The lower end of the nipple 57 is provided with a packing gland 61 through which the auger shaft 62 extends, and the outer end of the auger shaft 62 is secured by a coupling 63 to a reduction gear 64 of a motor 45 which is connected to the reduction gear by a belt 65 that is trained over pulleys 66 and 67.

The auger shaft 62 extends through a housing 68 and the inner end is supported in a bearing support 69 from which a reducing fitting 70 extends and the small end of the fitting 70 is provided with a flange 71 that is connected by bolts 72 to a flange 73 of the sphincter valve 37 which includes an elastic tube 38 flanged at the ends, and positioned with the flange 74 clamped between flanges 75 and 76 at one end and 71 and 73 at the opposite end.

The housing 39 of the sphincter valve 37 is provided with an inlet 40 through which compressed air is forced into annular chamber 42 against flexible tube 38, thereby collapsing tube 38 against the cooked materials. The sphincter valve 37 is controlled by air pressure induced through pipe 40 and regulated by valve 41 and indicated on gauge 43.

The motor 31 drives the screw conveyor 33 through a belt 85 which is trained over pulleys 86 and 87 on shafts 88 and 89.

From the foregoing description, it is thought to be obvious that an apparatus for continuous pressure cooking of fibrous materials conducted in accordance with this invention is particularly well adapted for use, by reason of the convenience and facility with which it may be assembled and operated.

What is claimed is:

1. A system for continuous conversion of wet poultry feathers into meal material, comprising:
   (a) a charging chamber,
   (b) a first charging auger in said chamber,
   (c) feeder mechanism for feeding materials into the charging chamber,
   (d) a reduction chamber comprising a converging tube extending from the charging chamber,
   (e) a pressure chamber connected with the reduction chamber, with the charging auger serving to convey feathers from the charging chamber and compress them in the reduction chamber forming thereby a pressure sealing plug for maintaining pressure in the pressure chamber,
   (f) a valve at the junction of the reduction chamber and the pressure chamber, (g) a pressure cooking chamber having two ends connected at one end to the pressure chamber, (h) conveying means in said pressure cooking chamber to force the materials to the opposite end of the pressure cooking chamber, (i) discharge means depending from the above-stated opposite end of the pressure cooking chamber, said discharge means including a reduction chamber, (j) a second charging auger connected to said last mentioned reducing chamber for conveying the cooked feathers from the cooking chamber and compressing them in the reducing chamber, forming thereby a pressure sealing plug for maintaining pressure in the cooking chamber, (k) a sphincter valve having pressure-controlled flexible walls and controlling the exit of the materials from said last mentioned reducing chamber, and (l) motor means for driving the aforesaid feeder mechanism, charging auger, conveying means and the second charging auger.

2. The system set forth in claim 1, wherein the valve at the junction of the reduction chamber and the pressure chamber normally allows restricted flow of the material when in open position and when in closed position prevents flow of the material causing a pressure increase in the reducing chamber to effectively pack the material therein and prevent backflow of pressure from the charging chamber.

3. The system of claim 1, wherein the valve is provided with means for cutting the material when the valve is moved to closed position.

4. The system of claim 1, wherein the pressure cooking chamber consists of a steam-jacketed pipe.

5. The system of claim 1, including means for controlling the pressure within the pressure cooking chamber.

References Cited

UNITED STATES PATENTS

| | | | |
|---|---|---|---|
| 1,203,175 | 10/1916 | Blacklock | 99—237 |
| 1,275,558 | 8/1918 | Holmgreen. | |
| 1,849,292 | 3/1932 | Gordon. | |
| 1,922,313 | 8/1933 | Mason. | |
| 2,524,999 | 10/1950 | Schulerud. | |
| 2,702,245 | 2/1955 | Mayer | 99—4 XR |
| 3,050,771 | 8/1962 | Mylchreest. | |
| 3,252,406 | 5/1966 | Altman | 99—237 XR |
| 3,263,592 | 8/1966 | Hickey et al. | 99—235 |

FOREIGN PATENTS

| | | |
|---|---|---|
| 726,659 | 1/1966 | Canada. |

WALTER A. SCHEEL, Primary Examiner

J. M. NEARY, Assistant Examiner

U.S. Cl. X.R.

19—4; 99—2, 443